(12) United States Patent
Morenko

(10) Patent No.: US 11,143,108 B2
(45) Date of Patent: Oct. 12, 2021

(54) ANNULAR HEAT SHIELD ASSEMBLY FOR COMBUSTOR

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 141 days.

(21) Appl. No.: 16/295,753

(22) Filed: Mar. 7, 2019

(65) Prior Publication Data

US 2020/0284199 A1 Sep. 10, 2020

(51) Int. Cl.
*F02C 7/24* (2006.01)
*F23R 3/46* (2006.01)

(52) U.S. Cl.
CPC . *F02C 7/24* (2013.01); *F23R 3/46* (2013.01)

(58) Field of Classification Search
CPC ...................................... F02C 7/24; F23R 3/46
See application file for complete search history.

(56) References Cited

U.S. PATENT DOCUMENTS

| | | | | |
|---|---|---|---|---|
| 5,079,915 A | * | 1/1992 | Veau | F02K 1/822 |
| | | | | 60/766 |
| 5,799,491 A | * | 9/1998 | Bell | F23R 3/002 |
| | | | | 60/752 |
| 6,938,424 B2 | * | 9/2005 | Tiemann | F23M 5/02 |
| | | | | 60/752 |
| 7,770,398 B2 | * | 8/2010 | De Sousa | F23R 3/007 |
| | | | | 60/752 |
| 8,683,806 B2 | | 4/2014 | Commaret et al. | |
| 8,984,896 B2 | | 3/2015 | Davenport et al. | |
| 2002/0157400 A1 | * | 10/2002 | Schulten | F23R 3/46 |
| | | | | 60/772 |
| 2016/0215980 A1 | | 7/2016 | Chang | |
| 2016/0230996 A1 | | 8/2016 | Kostka et al. | |
| 2017/0248316 A1 | | 8/2017 | Hannwacker et al. | |
| 2020/0109088 A1 | * | 4/2020 | Lange | C04B 41/5032 |

* cited by examiner

*Primary Examiner* — Arun Goyal
(74) *Attorney, Agent, or Firm* — Norton Rose Fulbright Canada LLP

(57) ABSTRACT

An annular heat shield arrangement for a combustor liner comprises annular heat shield assemblies. The annular heat shield assemblies include heat shield segments circumferentially distributed around an axis of the annular heat shield assembly. The heat shield segments extend from a first lateral edge face to a second lateral edge face, a first overlap joint portion being defined at the first lateral edge face, a second overlap joint portion being defined at the second lateral edge face. The first overlap joint portion and the second overlap joint portion are complementary to form an overlap joint when pairs of the heat shield segments are side by side in any one of the heat shield assemblies. An adjacent pair of the annular heat shield assemblies are connected to one another at an overlap between the pair, and wherein the overlap joints from a first of the annular heat shield assemblies of the pair are circumferentially offset from a second of the annular heat shield assemblies of the pair.

13 Claims, 5 Drawing Sheets

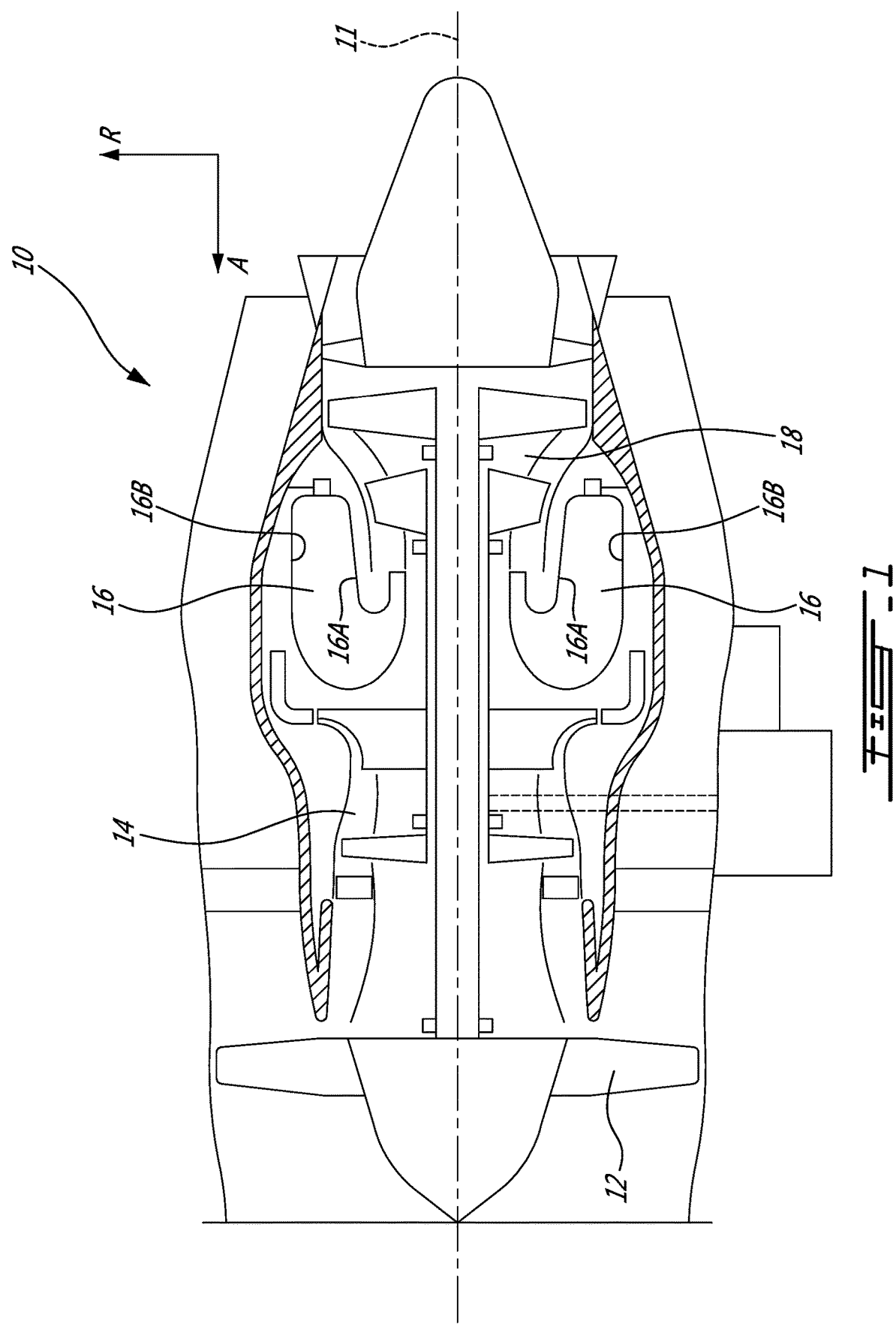

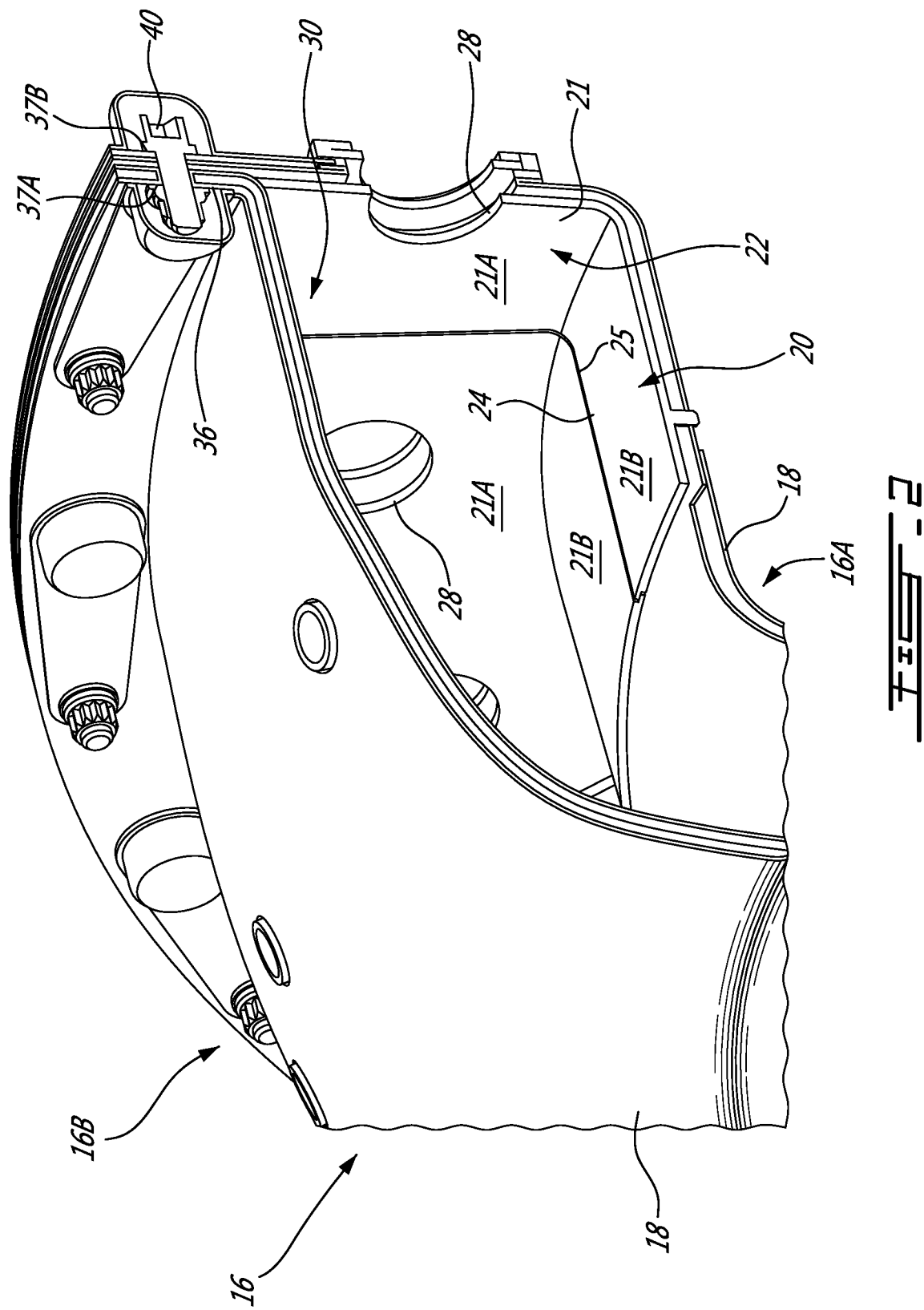

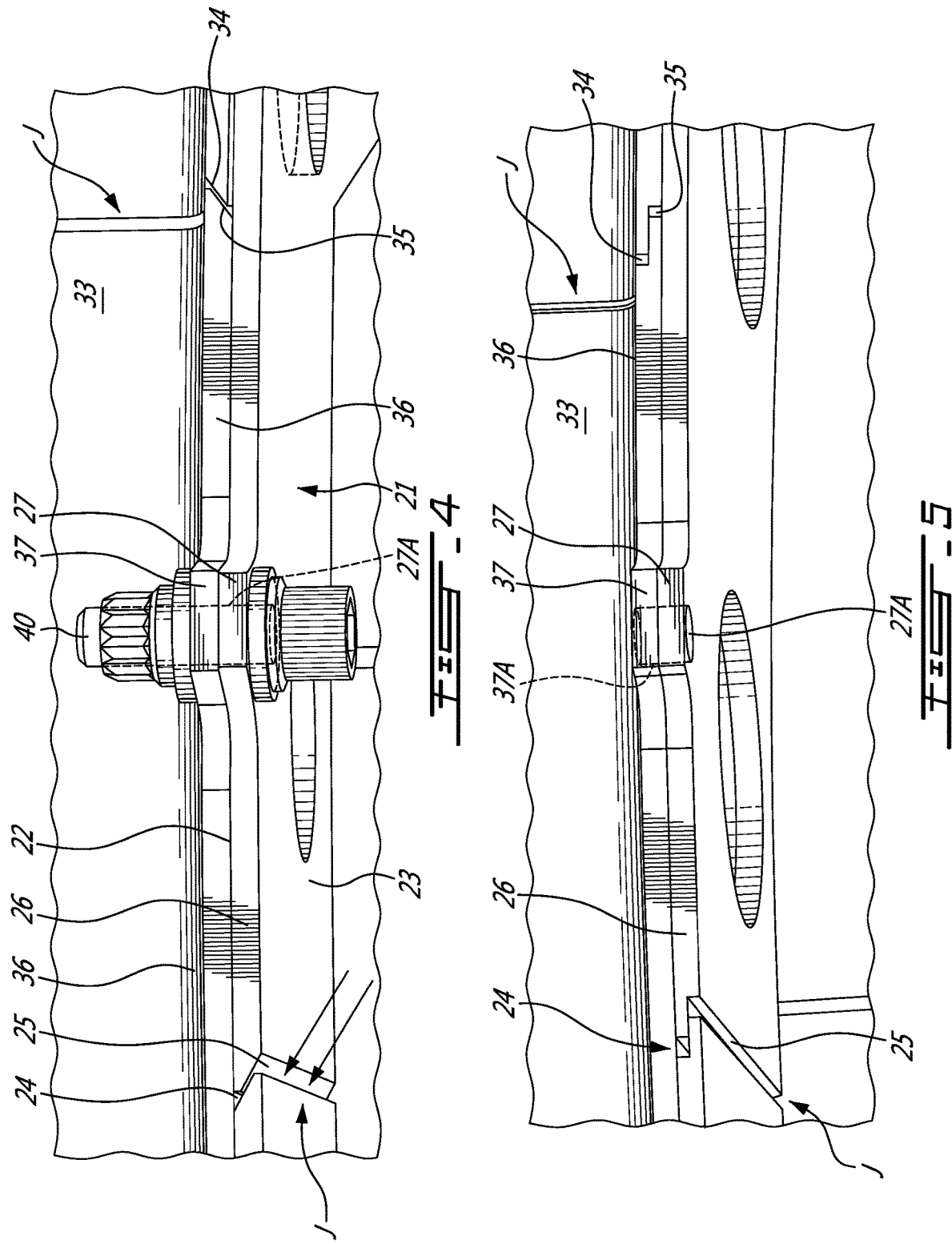

ANNULAR HEAT SHIELD ASSEMBLY FOR COMBUSTOR

TECHNICAL FIELD

The application relates gas turbine engines and more particularly to combustor liners with heat shield assemblies.

BACKGROUND

Combustor configurations may include heat shields in the form of separate panels attached to the combustor. Due to a difference in thermal growth between the combustor liner and the heat shield panels, the heat shield panels may be separated by a gap. The heat shields may be separated from the combustor liner, and as a result cooling air may escape into the combustor, resulting in a cooling and/or loss of efficiency.

SUMMARY

In one aspect, there is provided an annular heat shield arrangement for a combustor liner comprising annular heat shield assemblies, any one of the annular heat shield assemblies including heat shield segments circumferentially distributed around an axis of the annular heat shield assembly, any one of the heat shield segments extending from a first lateral edge face to a second lateral edge face, a first overlap joint portion being defined at the first lateral edge face, a second overlap joint portion being defined at the second lateral edge face, wherein the first overlap joint portion and the second overlap joint portion are complementary to form an overlap joint when pairs of the heat shield segments are side by side in any one of the heat shield assemblies, wherein an adjacent pair of the annular heat shield assemblies are connected to one another at an overlap between the pair, and wherein the overlap joints from a first of the annular heat shield assemblies of the pair are circumferentially offset from a second of the annular heat shield assemblies of the pair.

In another aspect, there is provided a combustor comprising annular heat shield assemblies, at least one of the annular heat shield assemblies including heat shield segments circumferentially distributed around an axis of the annular heat shield assembly, any one of the heat shield segments extending from a first lateral edge face to a second lateral edge face, a first overlap joint portion being defined at the first lateral edge face, a second overlap joint portion being defined at the second lateral edge face, wherein the first overlap joint portion and the second overlap joint portion are complementary to form an overlap joint when pairs of the heat shield segments are side by side in any one of the heat shield assemblies, wherein an adjacent pair of the annular heat shield assemblies are connected to one another at an annular overlap between the pair.

In another aspect, there is provided an annular heat shield arrangement for a combustor liner comprising heat shield segments provided in a plurality of layers, from the heat shields of said layers arranged to abut along adjacent lateral edges within a said layer, the segments having complementary first and second overlap portions cooperating to form an overlap joint between adjacent heat shields of a layer, and wherein overlap joints of one said layer are circumferentially offset relative to overlap joints of an adjacent said layer.

DESCRIPTION OF THE DRAWINGS

Reference is now made to the accompanying figures in which:

FIG. 1 is a schematic cross-sectional view of a gas turbine engine with an annular heat shield arrangement in accordance with the present disclosure;

FIG. 2 is a sectional perspective view of the annular heat shield arrangement of the present disclosure, in a metal shell;

FIG. 4 is a top view of the annular heat shield arrangement of the present disclosure, with bevel-lap overlap joints; and FIG. 5 is a top view of the annular heat shield arrangement of the present disclosure, with half-lap overlap joints.

DETAILED DESCRIPTION

Figure 3A:
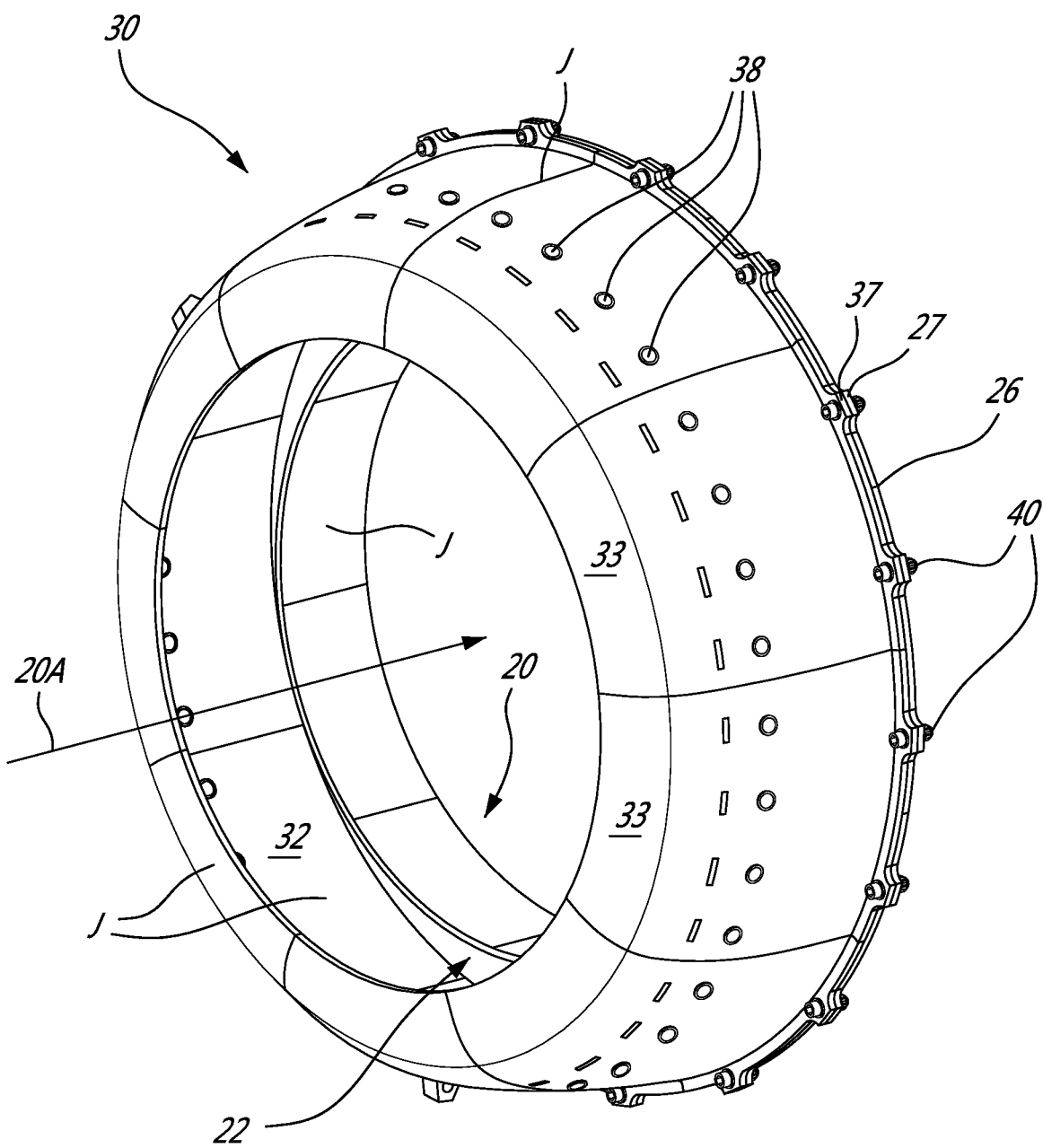
FIG. 3A is a first perspective view of the annular heat shield arrangement of the present disclosure.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Though the combustor 16 is illustrated as a reverse-flow type combustor, other combustor configurations are contemplated, such as annular straight-through and can-type combustors. Components of the engine 10 are rotatable about a longitudinal center axis 11 of the engine 10.

The combustor 16 may have a double-skin construction as detailed hereinafter. The combustor 16 is annular in shape, around center axis 11. This explains the mirror images of the combustor 16 in FIG. 1, relative to the center axis 11. The combustor 16 may have an annular combustor chamber defined between an inner liner 16A and an outer liner 16B. Other configurations include a can-type combustor featuring a single liner, etc. In an example in which the combustor 16 is annular, either one or both of the inner liner 16A and outer liner 16B may have double-skin constructions on part or all of the combustor 16. In a double-skin configuration, the skins are spaced apart from one another for back-side impingement and front-side effusion cooling. The skins may be connected to one another so as to allow the thermal expansion of the skins relative to one another. The outer skin or outer shell is shown at 18 in FIG. 2. The outer skin 18 serves as the structural component of the combustor 16. The outer skin 18 may be interfaced to a structure of the engine 10, and may support various components, such as an inner skin or heat shield described below, fuel manifold and/or fuel nozzle(s), etc. The outer skin 18 is for instance made of a metallic material.

An annular heat shield arrangement in accordance with the present disclosure is generally shown in FIGS. 2-5. The annular heat shield arrangement may be known as an inner skin, in that it is located inside the combustor 16, relative to the outer skin 18. The inner skin may also be referred to as a heat shield. Referring to FIGS. 2-5, the annular heat shield arrangement is shown having annular heat shield assembly 20 and annular heat shield assembly 30. The annular heat shield assembly 20 and annular heat shield assembly 30 may be interconnected to one another so as to form a structural integral assembly that may be maneuvered as one piece. For example, the annular heat shield arrangement of annular heat shield assembly 20 and annular heat shield assembly 30 may be as in FIGS. 3A and 3B, prior to its assembly into the gas turbine engine 10.

Figure 3B:
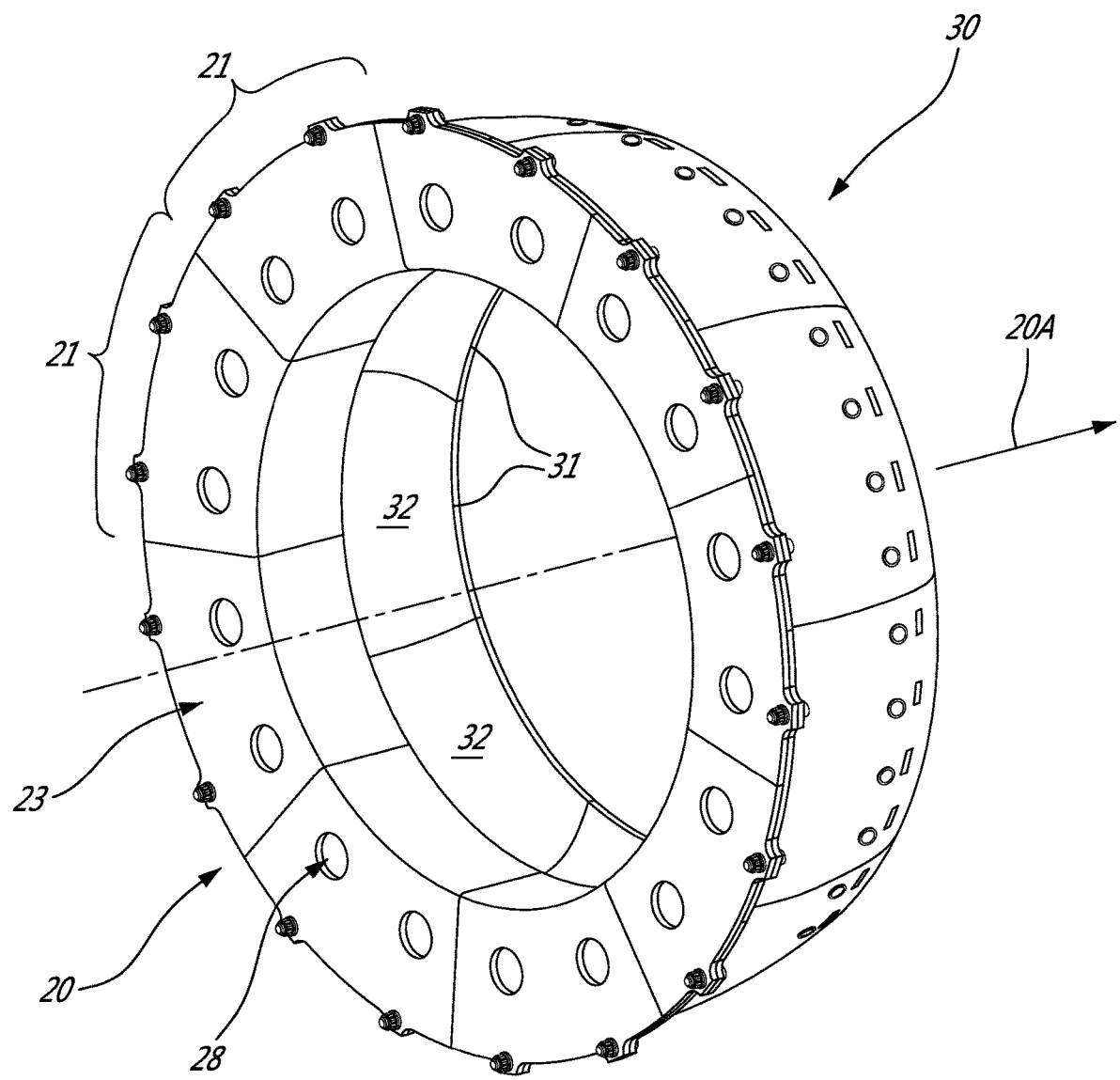
FIG. 3B is a first perspective view of the annular heat shield arrangement of the present disclosure

Referring to FIGS. 2 and 3B, the annular heat shield assembly 20 may have an annular body. The annular heat shield assembly 20 may also be referred to as a ring, annulus, ring assembly, etc. The annular heat shield assembly 20 may be concentrically positioned relative to the center axis 11 of the engine 10, i.e., a center axis 20A of the annular body of the annular heat shield assembly 20 may be coincident with the center axis 11. In another embodiment, the center axis 11 of the engine 10 and the center axis 20A are parallel or quasi parallel (e.g., more or less 5 degrees of difference) if they are not coincident.

The annular heat shield assembly 20 may be made of a plurality of side-by-side segments 21. The segments 21 may also be referred to as panels, plates, etc. In an embodiment, the segments 21 are one and the same, though it is contemplated to have segments 21 differing in shape and/or configuration as well. In an embodiment, the segments 21 are made of ceramic matrix composite (CMC), but may also be made of other suitable materials. In an embodiment, the segments 21 are monoblock CMC components. The CMC used is one in which fibers (e.g., ceramic fibers, silicon carbide, alumina, carbon, carbon fibers, etc) are embedded in a ceramic matrix. For example, the segments 21 may be made of tiles of CMC panels. As another possibility, the annular heat shield assembly 20 may be made of single annular body of CMC, i.e. over 360 degrees. In a radial plane (i.e., a plane in which the center axis 20A lies), the segments 21 may have a L-shape, inverted L-shape or a reversed L-shape, depending on the point of view. This may be the result of the segments 21 having an end portion 21A and a combustor portion 21B. The segments 21 may also have only one of the end portion 21A and the combustor portion 21B. The end portion 21A and the combustor portion 21B may merge at an arcuate portion, for example. The end portion 21A may be substantially planar, with the end portions 21A for example lying in a plane to which the center axis 20A is normal. In another embodiment, the end portions 21A of side by side segments 21 in the annular heat shield assembly 20 may from a frusto-conical surface.

The combustor portion 21B may extend in a generally axial direction, i.e., in a direction being generally parallel to the center axis 20A, or diverging by 0-20 degrees toward the center axis 20A. The segments 21 may have an inner face 22, and an outer face 23, bound laterally by a first lateral edge face 24 and a second lateral edge face 25. The inner face 22 is oriented toward an interior of the combustor 16, whereas the outer face 23 is oriented away from an interior of the combustor 16. The inner face 22 and/or outer face 23 of the end portion 21A, if present, may be substantially planar as described above. The inner face 22 and/or outer face 23 of the combustor portion 21B, if present, may be arcuately planar, i.e., may be a curved plane. Stated differently, the combustor portion 21B may be a segment of the annular body of the annular heat shield assembly 20, in such a way that the annular surface is defined by the sequence of inner faces 22 of the side by side segments 21, for an interior of the combustor 16, and by the sequence of outer faces 23 of the side by side segments 21, for an exterior of the combustor 16. Accordingly, a radius of the curved planes of inner faces 22 and/or outer faces 23 has a center coincident with the center axis 20A. There may be some discrete disruptions in the curved planes as described hereinafter.

Referring to FIGS. 4 and 5, the first lateral edge face 24 and second lateral edge face 25 are shown. The first lateral edge face 24 and the second lateral edge face 25 may have complementary joint portions, such that an overlap joint J is formed between the first lateral edge face 24 of a first of the segments 21, and the second lateral edge face 25 of a second of the segments 21, when the first and the second of the segments 21 are side by side. According to an embodiment, as shown in FIG. 4, the ends of the first lateral edge face 24 and second lateral edge face 25 may be bevelled (i.e., beveled) such that the overlap joint J may be a bevel joint, a.k.a., a bevel lap joint. The joint portions are said to be complementary, in that the bevel in the first lateral edge face 24 faces for example outwardly, whereas the second lateral edge face 25 faces inwardly. According to another embodiment, as shown in FIG. 5, the ends of the first lateral edge face 24 and second lateral edge face 25 may be half lap joint portions such that the overlap joint J may be a half lap joint. A half lap joint portion is defined by the presence of a shoulder along the edge face. FIGS. 4 and 5 describe two contemplated embodiments of overlap joints, other embodiments including for example a tongue and groove arrangement. As observed, the presence of an overlap joint J between adjacent segments 21 may allow movements therebetween, as such segments 21 may expand and/or contract as a function of thermal exposure. In an embodiment, there are no rigid interconnections at the overlap joints J, i.e., the overlap joint portions are simply against one another.

The examples given above for the overlap joint portions are observed not to project upwardly from the planes of the inner face 22 and/or outer face 23. However, some other overlap joint portions could project upwardly of the plane of the inner face 22 and/or outer face 23. In the illustrated embodiments in which the overlap joint portions do not project upwardly from the planes of the inner face 22 and/or outer face 23, the inner and outer annular surfaces resulting from the assembly of the side by side segments 21 are continuously annular, with seams between the adjacent segments 21 at given temperature ranges, and holes such as dilution holes, nozzle holes, cooling holes, etc. For instance, in the case of the inner annular surface, there may be no projecting disruption, as shown in FIGS. 2 and 3A. As another way to express the absence of upward projection, it may be said that the overlap joint portions would be entirely located between continuations of the planes (curved or flat) of the inner face and/or outer face 23.

As best seen in FIGS. 3B, 4 and 5, tabs 27 may extend from one of the end edges 26 of the segment 21, for connection of the annular heat shield assembly 20 with the annular heat shield assembly 30. In the annular heat shield assembly 20, the tabs 27 extend from the end edge 26 that is at the end portion 21A. The tab 27 may be made of the same material as a remainder of the segment 21. The tab 27 may feature a hole 27A. In the illustrated embodiment, there is one tab 27 per segment 21, although more could be present. In another embodiment, there are no tabs 27: the annular heat shield assembly 20 may rely on its end portion 21A to be secured to the annular heat shield assembly 30, such as with welding (when CMC is not used), clamping, etc.

Other features of the annular heat shield assembly 20 may include nozzle holes 28 in the end portion 21A and/or connectors for connection with the metal shell 18. These features may be optional as well.

Referring to FIGS. 2 and 3A, the annular heat shield assembly 30 may have an annular body. The annular heat shield assembly 30 also be referred to as a ring, annulus, ring assembly, etc. The annular heat shield assembly 30 may be concentrically or closely positioned relative to the center axis 11 of the engine 10, i.e., a center axis 20A of the annular body of the annular heat shield assembly 30, shared with annular heat shield assembly 20, may be coincident with the center axis 11.

The annular heat shield assembly 30 may be made of a plurality of side-by-side segments 31. The segments 31 may also be referred to as panels, plates, etc. In an embodiment, the segments 31 are one and the same, though it is contemplated to have segments 31 differing in shape and/or configuration as well. In an embodiment, the segments 31 are made of ceramic matrix composite (CMC). In an embodiment, the segments 31 are monoblock CMC components. The CMC used is one in which fibers (e.g., ceramic fibers, silicon carbide, alumina, carbon, carbon fibers, etc) are embedded in a ceramic matrix. For example, the segments 31 may be made of tiles of CMC panels. As another possibility, the annular heat shield assembly 30 may be made of single annular body of CMC, i.e. over 360 degrees. In a radial plane (i.e., a plane in which the center axis 20A lies), the segments 31 may have a L-shape, inverted L-shape or a reversed L-shape, depending on the point of view. This may be the result of the segments 31 curving from an upstream end, contacting the annular heat shield assembly 20, to a downstream end, to match the shape of the combustor 16. The segments may also have other geometries, including being substantially axial.

The segments 31 may have an inner face 32, and an outer face 33, bound laterally by a first lateral edge face 34 and a second lateral edge face 35. The inner face 32 is oriented toward an interior of the combustor 16, whereas the outer face 33 is oriented away from an interior of the combustor 16. The inner face 32 and/or outer face 33 may be arcuately planar, i.e., may be a curved plane. Stated differently, the segments 31 form the annular body of the annular heat shield assembly 20, in such a way that the annular surface is defined by the sequence of inner faces 32 of the side by side segments 31, for an interior of the combustor 16, and by the sequence of outer faces 33 of the side by side segments 31, for an exterior of the combustor 16. Accordingly, a radius of the curved planes of inner faces 32 and/or outer faces 33 has a center coincident with the center axis 20A. There may be some discrete disruptions in the curved planes as described hereinafter.

Referring to FIGS. 4 and 5, the first lateral edge face 34 and second lateral edge face 35 are shown. The first lateral edge face 34 and the second lateral edge face 35 may have complementary joint portions, such that an overlap joint J is formed between the first lateral edge face 34 of a first of the segments 31, and the second lateral edge face 35 of a second of the segments 31, when the first and the second of the segments 31 are side by side. According to an embodiment, as shown in FIG. 4, the ends of the first lateral edge face 34 and second lateral edge face 35 may be bevelled (i.e., beveled) such that the overlap joint J may be a bevel joint, a.k.a., a bevel lap joint. The joint portions are said to be complementary, in that the bevel in the first lateral edge face 34 faces for example outwardly, whereas the second lateral edge face 35 faces inwardly. According to another embodiment, as shown in FIG. 5, the ends of the first lateral edge face 34 and second lateral edge face 35 may be half lap joint portions such that the overlap joint J may be a half lap joint. A half lap joint portion is defined by the presence of a shoulder along the edge face. FIGS. 4 and 5 describe two contemplated embodiments of overlap joints, other embodiments including for example a tongue and groove arrangement. As observed, the presence of an overlap joint J between adjacent segments 31 may allow movements therebetween, as such segments 31 may expand and/or contract as a function of thermal exposure. In an embodiment, there are no rigid interconnections at the overlap joints J, i.e., the overlap joint portions are simply against one another. As shown in FIGS. 4 and 5, the overlaps of the annular heat shield assembly 20 and annular heat shield assembly 30, with the overlap joints J in both, may be the same type of overlap joints J. It is also possible to use different types of overlap joints J in the annular heat shield assembly 20 and annular heat shield assembly 30.

The examples given above for the overlap joint portions are observed not to project upwardly from the planes of the inner face 32 and/or outer face 33. However, some other overlap joint portions could project upwardly of the plane of the inner face 32 and/or outer face 33. In the illustrated embodiments in which the overlap joint portions do not project upwardly from the planes of the inner face 32 and/or outer face 33, the inner and outer annular surfaces resulting from the assembly of the side by side segments 31 are continuously annular, with seams between the adjacent segments 31 is given temperature ranges, and holes such as dilution holes, nozzle holes, cooling holes, etc. For instance, in the case of the inner annular surface, there may be no projecting disruption, as shown in FIGS. 3A and 3B. As another way to express the absence of upward projection, it may be said that the overlap joint portions would be entirely located between continuations of the planes (curved or flat) of the inner face and/or outer face 33.

As best seen in FIGS. 3B, 4 and 5, tabs 37 may extend from one of the end edges 36 of the segment 31, for connection of the annular heat shield assembly 20 with the annular heat shield assembly 30. The end edge 36 may be in the form of a flange, as illustrated in the figures. In the annular heat shield assembly 30, the tabs 37 extend from the end edge 36 that is defined by the flange, i.e., an end edge flange. The tab 37 may be made of the same material as a remainder of the segment 31. The tab 37 may feature a hole 37A. In the illustrated embodiment, there is one tab 37 per segment 31, although more could be present. In another embodiment, there are no tabs 37: the annular heat shield assembly 30 may rely on its end edge flange 36 to be secured to the annular heat shield assembly 20, such as with welding, clamping, etc.

Other features of the annular heat shield assembly 30 may include dilution holes 38 and/or connectors for connection with the metal shell 18. These features may be optional as well.

Referring to FIGS. 3A-3B, 4 and 5, the annular heat shield arrangement shows the annular heat shield assembly 20 and the annular heat shield assembly 30 assembled to one another. When the annular heat shield assembly 20 and the annular heat shield assembly 30 are assembled, the tabs 27 and 37 are in register and against one another. Moreover, the end portion 21A of the annular heat shield assembly 20 may be physically in contact with the end edge 36 or end edge flange 36 of the annular heat shield assembly 30. Stated differently, there is an annular overlap between the annular heat shield assembly 20 and the annular heat shield assembly 30 in the annular heat shield arrangement. Connectors 40 such as bolts and nuts, with or without washers, are passed through the holes 27A and 37A of the tabs 27 and 37. Other connectors 40 may be used, such as welding (not for CMC), clamps, etc. For example, the annular overlap may be welded or clamped. In an embodiment, annular heat shield assembly may be interconnected via end edge flanges—such as the one of the annular heat shield assembly 30—mirroring one another.

Referring to FIGS. 3A-3B, 4 and 5, the overlap joints J from the annular heat shield assembly 20 are circumferentially offset from the overlap joints J from the annular heat shield assembly 30. Therefore, a leakage or fluid path through the overlap joint J of the annular heat shield assembly 20 or of the annular heat shield assembly 30 is blocked by the other of the annular heat shield assembly 20 and 30. In another embodiment, only one of the annular heat shield assembly 20 and annular heat shield assembly 30 is made of heat shield segments, 21 or 31, with the other of the annular heat shield assembly 20 and 30 being a monoblock annulus without overlap joints J, and thus without leakage through said overlap joints J.

As observed in FIGS. 2, 3A and 3B, one of the heat shield assembly 20 and 30 may be part of the outer liner 16B, while the other of the heat shield assembly 20 and 30 may form part of the inner liner 16A. In the illustrated embodiment, the heat shield assembly 20 is part of the inner liner 16A and may also cover a nozzle end or dome of the combustor 16. Still in the illustrated embodiment, the heat shield assembly 30 is part of the outer liner 16B. Therefore, an annular space or volume is concurrently defined and delimited by the inner faces 22 and 32 of the assemblies 20 and 30, respectively. This annular space or volume is part of the combustion chamber of the combustor. Other arrangements are contemplated, for instance by having the assemblies be both part of the liners 16A or of the liners 16B.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An annular heat shield arrangement of a combustor, the combustor comprising an inner liner and an outer liner, each of the inner liner and the outer liner comprising annular heat shield assemblies, any one of the annular heat shield assemblies comprising:
   heat shield segments circumferentially distributed around an axis of the annular heat shield assembly, any one of the heat shield segments extending circumferentially from a first lateral edge face to a second lateral edge face circumferentially spaced apart from the first lateral edge, the first lateral edge face and the second lateral edge face extending axially from an upstream edge to a downstream edge, a first overlap joint portion being defined at the first lateral edge face, a second overlap joint portion being defined at the second lateral edge face,
   wherein the first overlap joint portion of a first of the heat shield segments and the second overlap joint portion of a second of the heat shield segments are complementary to form an overlap joint extending from the upstream edge to the downstream edge between the first and the second of the heat shield segments,
   wherein the first and the second of the heat shield segments define one of a plurality of pairs of the heat shield segments of one of the annular heat shield assemblies, a first set of the plurality of pairs forming a part of the inner liner and a second set of the plurality of pairs forming a part of the outer liner,
   wherein the first set of the plurality of pairs and the second set of the plurality of pairs of the annular heat shield assemblies are connected to one another at an annular overlap between two of the annular heat shield assemblies, and
   wherein the overlap joint on the first set of the plurality of pairs is circumferentially offset from the overlap joint on the second set of the plurality of pairs.

2. The annular heat shield arrangement according to claim 1, wherein the annular overlap includes an annular end edge flange of at least one of the annular heat shield assemblies.

3. The annular heat shield arrangement according to claim 2, wherein the annular overlap includes a flat annular portion of another of the annular heat shield assemblies.

4. The annular heat shield arrangement according to claim 1, wherein the annular overlap includes an annular contact area between the annular heat shield assemblies, and throughbores in the annular heat shield assemblies adapted to receive fasteners.

5. The annular heat shield arrangement according to claim 4, wherein the throughbores are in tabs projecting radially relative to the annular contact area.

6. The annular heat shield arrangement according to claim 4, including one of said throughbores for any one of the heat shield segments.

7. The annular heat shield arrangement according to claim 1, wherein the heat shield segments are monoblock panels of ceramic matrix composite.

8. The annular heat shield arrangement according to claim 1, wherein the heat shield segments have an inner face oriented toward the axis and an opposed outer face oriented away from the axis, and wherein the first overlap joint portion and the second overlap joint portion are entirely within projections of planes of the inner face and/or the outer face.

9. The annular heat shield arrangement according to claim 8, wherein the first overlap joint portion and the second overlap joint portion include a bevel.

10. The annular heat shield arrangement according to claim 8, wherein the overlap joints are half lap joints.

11. The annular heat shield arrangement according to claim 1, wherein the heat shields segments of any one of the annular heat shield assemblies are the same.

12. The annular heat shield arrangement according to claim 1, wherein the heat shield segments have an inner face facing toward the axis and an opposed outer face facing away from the axis, the first overlap joint portion and the second overlap joint portion being free of projections extending radially past the inner face and/or the outer face.

13. The annular heat shield arrangement according to claim 1, wherein the overlap joint is free of interconnections between the first overlap joint portion and the second overlap joint portion, the overlap joint formed by abutment between the first overlap joint portion and the second overlap joint portion.

* * * * *